(12) United States Patent
Marchese et al.

(10) Patent No.: US 11,884,819 B2
(45) Date of Patent: Jan. 30, 2024

(54) THERMOPLASTIC COMPOSITION FOR 3D PRINTING

(71) Applicant: Henkel AG & Co. KGaA, Duesseldorf (DE)

(72) Inventors: Luca Mario Marchese, Arese (IT); Fabio Angelo Spada, Carate Brianza (IT); Joerg Uebele, Steinheim-Hoepfigheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/856,087

(22) Filed: Apr. 23, 2020

(65) Prior Publication Data

US 2020/0247995 A1 Aug. 6, 2020

Related U.S. Application Data

(63) Continuation of application No. PCT/EP2018/075907, filed on Sep. 25, 2018.

(30) Foreign Application Priority Data

Oct. 27, 2017 (EP) .................................... 17198795

(51) Int. Cl.
| | |
|---|---|
| *B29C 64/118* | (2017.01) |
| *C08L 77/08* | (2006.01) |
| *B33Y 70/10* | (2020.01) |
| *B33Y 10/00* | (2015.01) |
| *B29K 23/00* | (2006.01) |
| *B29K 77/00* | (2006.01) |
| *B29K 309/08* | (2006.01) |

(52) U.S. Cl.
CPC ............ *C08L 77/08* (2013.01); *B29C 64/118* (2017.08); *B33Y 70/10* (2020.01); *B29K 2023/12* (2013.01); *B29K 2077/00* (2013.01); *B29K 2309/08* (2013.01); *B33Y 10/00* (2014.12); *C08L 2205/02* (2013.01)

(58) Field of Classification Search
None
See application file for complete search history.

(56) References Cited

U.S. PATENT DOCUMENTS

| | | | | |
|---|---|---|---|---|
| 2004/0242737 | A1* | 12/2004 | Topulos | C08L 77/00 524/379 |
| 2010/0227973 | A1* | 9/2010 | Facinelli | C08G 69/14 528/323 |
| 2014/0141166 | A1 | 5/2014 | Rodgers | |

FOREIGN PATENT DOCUMENTS

| | | | |
|---|---|---|---|
| DE | 10 2011 011427 A1 | * | 8/2012 |
| DE | 102011011427 A1 | | 8/2012 |
| GB | 1200547 A | * | 7/1970 |
| GB | 1200547 A | | 7/1970 |

(Continued)

OTHER PUBLICATIONS

DIN EN ISO 11357-3:2013-04.

(Continued)

*Primary Examiner* — Mohammad M Ameen
(74) *Attorney, Agent, or Firm* — James E. Piotrowski

(57) ABSTRACT

The present invention relates to a thermoplastic composition comprising an amorphous polyamide polymer for use in 3D printing, the respective use and methods for forming objects by 3D printing using the thermoplastic compositions described herein.

15 Claims, 2 Drawing Sheets

(56) References Cited

FOREIGN PATENT DOCUMENTS

| | | | | |
|---|---|---|---|---|
| JP | S-60124616 | A | * | 7/1985 |
| JP | S60124616 | A | | 7/1985 |
| JP | S 60124616 | A | * | 7/1995 |
| WO | 2016050910 | A1 | | 4/2016 |

OTHER PUBLICATIONS

ASTM D 1238/ISO 1133.
ASTM D638 Mechanical Tensile Properties.
ASTM E 28.
International Search Report for International PCT Patent Application No. PCT/EP2018/075907 dated Jan. 4, 2019.
The three main types of 3D printing technologies—Third, Fused Deposition Modeling (FDM) or Fused Filament Fabricartion (FFF).

* cited by examiner

THERMOPLASTIC COMPOSITION FOR 3D PRINTING

FIELD

The present invention relates to a thermoplastic composition comprising an amorphous polyamide polymer for use in 3D printing, the respective use and methods for forming objects by 3D printing using the thermoplastic compositions described herein.

BRIEF DESCRIPTION OF RELATED TECHNOLOGY

Thermoplastic compositions for 3D printing typically consist of a polymer composition which is deposited layer by layer until a three-dimensional object is formed. The technology used by most 3D printers to date is fused filament fabrication (FFF) also known as fused deposition modeling (FDM), a special application of plastic extrusion. FFF generally involves heating up a thermoplastic compound or composition to a semi-liquid state and depositing it in beads along the extrusion path in a layer by layer deposition from the bottom up. FFF requires therefore direct deposition of molten layers through a nozzle that applies a bead over another bead until the part is completed. In normal FFF 3D printers the application nozzle is fed by the material in a filament. Normally these additive methods are applied on "desktop" scale. However, FFF technique could be used to realize bigger parts and objects by using a 3D printer which utilizes an extruder melting the thermoplastic material fed directly in granules.

Hence, the 3D printing process requires a material capable to build up a layer by layer structure and realize objects that can be stand-alone objects or part of objects that are made by an assembly of printed elements. It is further common that support structures are needed for conventional FFF printing. Commonly used thermoplastic polymers in 3D printing to date are acrylonitrile butadiene styrene (ABS), poly(lactic acid) (PLA), polyamide 11 (PA 11) and polypropylene (PP). Also used are polycarbonate (PC), polyethylene terephtalate (PET), polybutyleneterephthalate (PBT) and polyamide 6 (PA 6). However, these thermoplastic polymers often have limitations in terms of interlayer adhesion, brittleness, warpage, or they require a high processing temperature. This is especially the case when the objects are of a dimension exceeding the above-mentioned "desktop" scale. A limitation in interlayer adhesion often results in the use of higher processing temperature in order to get a sufficiently low melt viscosity and guarantee the adhesion between overlapping beads that will form the final object. However, higher processing temperatures to improve adhesion and to give the appropriate rheology in deposition have the drawback of shrinkage that leads to deformation, such as warpage, after cooling, especially if a big object is printed.

SUMMARY

The inventors of the present invention have surprisingly found that the above-mentioned needs can be met by the specific thermoplastic composition for 3D printing of the present invention. In particular, the inventors have found, without being bound by theory, that the employment of the specific polyamide of the present invention, which is in the amorphous phase, reduces the effects of crystallization and post-crystallization both in pure phase and as main component of a thermoplastic composition. It provides sufficient surface hardness, without any brittleness of the final objects. Hence, the dimer based polyamide, by being amorphous and providing good adhesion, is a key factor in interlayer adhesion contributing to a good mechanical strength of the printed part.

In a first aspect, the present invention therefore relates to a thermoplastic polymer composition for 3D printing, comprising:
 (a) at least 25 wt.-%, preferably at least 30 wt.-%, more preferably at least 40 wt.-% of an amorphous polyamide polymer, the polyamide polymer being obtainable by polymerizing
  a1) at least one dimerized fatty acid;
  a2) optionally at least one mono carboxylic acid;
  a3) optionally at least one linear dicarboxylic acid; and
  a4) at least one linear diamine;
 (b) at least 5 wt.-% of a crystalline or semicrystalline thermoplastic polymer, preferably selected from polypropylene (PP), ethylvinylacetate (EVA), polyacrylate, poly(lactic acid), polyamide different from (a), and combinations thereof, more preferably isotactic PP or EVA;
 (c) optionally at least 0.1 wt.-% of a compatibilizing agent; and
 (d) optionally at least 1 wt.-%, preferably at least 3 wt.-%, more preferably at least 5 wt.-% of a filler, preferably a reinforcing filler, more preferably a fibrous filler.

In another aspect, the invention relates to the use of a thermoplastic polymer composition comprising:
 (a) at least 25 wt.-%, preferably at least 30 wt.-%, more preferably at least 40 wt.-% of an amorphous polyamide polymer, the polyamide polymer being obtainable by polymerizing
  a1) at least one dimerized fatty acid;
  a2) optionally at least one mono carboxylic acid;
  a3) optionally at least one linear dicarboxylic acid; and
  a4) at least one linear diamine
 as a 3D-printing material.

In still another aspect, the invention is directed to a method for 3D printing an object, the method comprising:
 A) melting a thermoplastic polymer composition comprising at least 25 wt.-%, relative to the total weight of the composition, of an amorphous polyamide polymer, the polyamide polymer being obtainable by polymerizing
  a1) at least one dimerized fatty acid;
  a2) optionally at least one mono carboxylic acid;
  a3) optionally at least one linear dicarboxylic acid; and
  a4) at least one linear diamine;
 B) printing the melted composition of A) using a 3D printer, preferably with the fused modelling deposition (FDM) technique, to form an object.

Further preferred embodiments are set forth in the appended claims.

DETAILED DESCRIPTION

Figure 1:
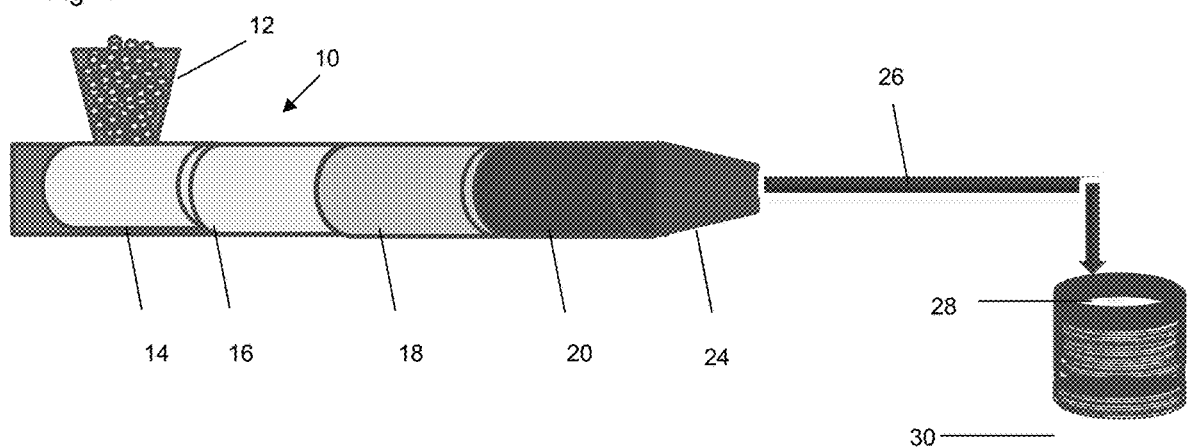
FIG. 1 is an embodiment of an exemplary extruder such as a 3D printer.

In the present specification the terms "a" and "an" and "at least one" are the same as the term "one or more" and can be employed interchangeably.

In the following "CX", wherein X is an integer, refers to the number of carbon atoms.

The amorphous polyamides used in accordance with the invention are copolymers containing dimerized fatty acids in their backbones and are known as "copolyamide hot melts". The polyamides can be prepared from different monomers. Preferably, the number average molecular weight is selected such that a polyamide is obtained which can be processed as a melt at temperatures below 250° C. Dimerized fatty acid, mono carboxylic acid, linear dicarboxylic acid and linear diamines can be used as components of the polyamide, which are generally known to the skilled person. Preferably acid terminated polyamides are employed, more preferably linear acid terminated polyamides.

The dimerized fatty acids (compound a1)), sometimes referred to in the literature as "dimer acids", are complex mixtures resulting from the polymerization of fatty acids. These dimerized fatty acids are obtained by coupling unsaturated long chain monobasic fatty acids, e.g. linoleic acid, linolenic acid or oleic acid, to each other to obtain a dimer. The fatty acids may be derived from biological materials, such as plant or vegetable feedstock. A mixture of polymeric fatty acids can be employed as well. Those are for example commercially available from the polymerization of tall oil fatty acids. These polymeric fatty acids preferably have the following typical composition: C18 monobasic acids (monomer) about 0 to 5 wt.-%, C36 dibasic acids (dimer) 60 to 95 wt.-%, sometimes up to about 98 wt.-%, C54 and higher polybasic acids (trimer) about 1 to 35 wt.-%, based on the total weight of the polymeric fatty acid. The relative ratios of monomer, dimer and trimer in the polymeric fatty acids depend on the nature of the starting material, the conditions of polymerization and the degree of purification. Purer grades of polymeric fatty acids are obtained by distillation and contain at least 70 wt.-%, preferably 80 wt.-% and frequently up to 95 wt.-% or even 98 wt.-% of the total weight of the dimerized fatty acid. The dimerized fatty acids may be unhydrogenated or hydrogenated.

In addition to the dimerized fatty acids, at least one mono carboxylic acid (compound a2)) may be employed in the preparation of the polyamide according to the present invention. In preferred embodiments the at least one mono carboxylic acid a2) is selected from the group consisting of linear and branched C3 to C24 mono carboxylic acids or combinations thereof, more preferably from linear and branched C12 to C18 mono carboxylic acids or combinations thereof, most preferably from linear C14 to C18 mono carboxylic acids or combinations thereof. The carboxylic acids a2) can be saturated or unsaturated, preferably they are saturated.

Furthermore, in the preparation of the polyamide at least one linear dicarboxylic acid may be employed (compound a3)). In preferred embodiments the at least one linear dicarboxylic acid a3) is selected from the group consisting of linear C6 to C18 dicarboxylic acids and combinations thereof, more preferably from linear C10 to C14 dicarboxylic acids and combinations thereof, most preferably compound a3) is a linear C14 dicarboxylic acid. The dicarboxylic acids a3) can be saturated or unsaturated, preferably they are saturated.

The at least one linear diamine (compound a4)) is preferably selected from one or more linear aliphatic diamines, more preferably the linear aliphatic diamines have C1 to C10 carbon atoms. Specific examples are 1,2-ethylenediamine, 1,3-diaminopropane, 1,4-diaminobutane and 1,6-hexamethylene diamine. In most preferred embodiments the linear diamine is 1,2-ethylenediamine.

The polyamides according to the invention may be obtained with conventional condensation methods and the equivalent ratio of $NH_2$ groups of a4) to the sum of the COOH groups of a1) to a3) is preferably from 1.5:1 to 1:1.5, more preferably 1.2:1 to 1:1.2, even more preferably about 1:1.2. "About", as used herein in relation to a numerical value, means said value ±10%, preferably ±5%.

In the majority of cases, it is preferred that residual acid groups or residual amino groups be present after the condensation, more preferred are residual acid groups. The polyamides may be prepared by bulk polycondensation at a high temperature. Catalyst addition or removal of water to obtain a high conversion during reaction is optional. Preferably, the condensation reaction does not require the use of a solvent.

When choosing the monofunctional, difunctional or trifunctional raw materials as monomers, the amount shall be selected so that preferably meltable, for example uncrosslinked polyamides shall be obtained. For example, if cross-linking/gelling occurs, then lowering the fraction of trifunctional components can result in polymers that do not tend to gel.

In preferred embodiments a1) to a3) are employed in the preparation of the polyamide as follows a1) is present in 50.0 to 85.0 wt.-%; a2) is present in 0.0 to 3.0 wt.-%; and a3) is present in 0.0 to 30.0 wt.-%, based on the total weight of the polyamide. In further preferred embodiment in addition to the before mentioned ranges for a1) to a3), a4) is present in 5.0 to 25.0 wt.-%, more preferred in 8.0 to 20.0 wt.-%.

The thermoplastic compositions according to the invention preferably comprises at least 25 wt.-% of the amorphous polyamide, preferably at least 30 wt.-%, more preferably at least 40 wt.-%, most preferably at least 50 wt.-%. The thermoplastic compositions according to the invention may consist essentially of the amorphous polyamide, i.e. comprise at least 60, at least 70, at least 80 wt.-% or more of the polyamide. In certain embodiments, the amorphous polyamide comprises at most 95 wt.-%, preferably at most 90 wt.-% of the composition. Preferred amounts range from 45 to 85 wt.-%, preferably 50 to 85 wt.-%.

The thermoplastic compositions according to the invention may optionally contain crystalline or semi-crystalline polymers, different from the amorphous polyamide. These are preferably selected from polypropylene (PP) homo- and copolymers, in particular copolymers with ethylene, polyethylene (PE) homo- and copolymers, ethylvinylacetate (EVA), polyurethane polymers, rubber type polymers, styrene copolymers, polyester copolymers, polycarbonates, polyacrylate, thermoplastic polyurethanes and combinations thereof, more preferably from isotactic PP or EVA.

"Amorphous", as used herein, relates to polymers that have a randomly ordered molecular structure which does not have a sharp melt point. Instead amorphous materials soften gradually as the temperature rises. As used herein, amorphous polymers preferably have a crystallinity of less than 10%, preferably less than 5%, as determined by DSC according to DIN EN ISO 11357-3:2013-04.

"Semi-crystalline" and "crystalline", as used herein, relate to materials that have a highly ordered molecular structure with extended regions of crystallinity. Such polymers typically have sharp melt points and do not gradually soften with a temperature increase, with their behavior being dependent on the portion of crystalline regions in the polymer. "Semicrystalline", as used herein, relates to polymers having a crystallinity of more than 10% and less than 90%, with "crystalline" referring to polymers with a crystallinity of 90% and more, as determined by DSC according to DIN EN ISO 11357-3:2013-04.

The crystallinity of a given polymer can be determined by differential scanning calorimetry (DSC), with the respective methods and techniques known to those skilled in the art. If not stated otherwise, crystallinity is measured by DSC according to DIN EN ISO 11357-3:2013-04.

In embodiments wherein the at least one crystalline or semi-crystalline polymer is present, the thermoplastic composition according to the present invention preferably comprises at least 5 wt.-% of the at least one crystalline or semi-crystalline polymer, based on the total weight of the composition. In more preferred embodiments 5 to 50 wt.-% or 5 to 45 wt.-% are contained. A mixture of an amorphous polyamide with a crystalline or semi-crystalline polymer may advantageously reduce curling and warpage of the printed object. This allows for printing of relatively big objects and interlocking of printed objects in order to build more complex structures.

The thermoplastic compositions according to the invention may optionally contain a compatibilizing agent, provided that these compatibilizing agents do not interfere with the capability of the composition to be applied as a 3D printing material. Such agents include block and graft copolymers, including materials such as maleated aliphatic polymers, waxes, functionalized acrylates, polyolefine homo- and copolymers, such as ethylene/propylene copolymers, or copolymers/terpolymers with acrylic units, such as butyl acrylate, ethyl acrylate, methyl acrylate or the respective methacrylates. Particularly preferred are polymers functionalized with maleic acid or glycidyl groups, as those can react with amino or acid functional groups in the polyamide chain (end groups or side chains). By way of example, said agent may be a maleated (or glycidyl functionalized) terpolymer of ethylene/acrylic ester, such as random terpolymers of ethylene, acrylic acid ester and glycidyl methacrylate, commercially available under the name LOTADER® AX8900 from Arkema. Also preferred are maleic anhydride grafted polyolefins and waxes, such as those commercially available under the name Licocene® from Clariant or A-C® 1325P from Honeywell.

In embodiments wherein the at least one compatibilizing agent is present, the thermoplastic composition according to the present invention preferably comprises 0.1 to 20 wt.-% of compatibilizing agent, based on the total weight of the thermoplastic composition. In more preferred embodiments 0.1 to 10 wt.-%, most preferably 0.1 to 5 wt.-% are contained in the composition.

The thermoplastic composition may optionally comprise a filler. This filler may be a reinforcing filler, such as a fibrous filler. Suitable organic fillers include but are not limited to cellulosic fibers, wood particles, wood fibers, carbon black, aramid and combinations thereof. Examples for inorganic fillers include glass fibers, glass microspheres, silica, calcium carbonate, talc and combinations thereof. Such components are commercially available and known to the skilled person. Addition of a filler to the thermoplastic composition may improve the stiffness of the printed object.

In embodiments wherein the at least one filler is present, the thermoplastic composition according to the present invention preferably comprises at least 2, more preferably at least 5 wt.-% of a filler. In preferred embodiments, the filler content does not exceed 20 wt.-% or does not exceed 15 wt.-%.

In various embodiments, where medium to high printing speeds are desired, the amorphous polyamide polymer is used in amounts of 40 to 90 wt.-% and combined with a crystalline or semicrystalline polymer, as defined above.

In preferred embodiments, the crystalline or semicrystalline polymer is ethylene-vinyl acetate (EVA) and is used in an amount of up to 60 wt.-%, preferably 10 to 50 wt.-%, more preferably 20 to 40 wt.-% and most preferably 30 to 40 wt.-%. In such embodiments, a filler, such as a fibrous filler, more preferably a glass fibre filler may be used, preferably in amounts of 5 to 20 wt.-%, more preferably 10 to 15 wt.-%. The amorphous polyamide is thus used preferably in amounts of 45 to 60 wt.-%. Such compositions provide for high printing speeds in conventional 3D printers, good interlayer adhesion, and low sink properties while retaining good mechanical properties.

In other preferred embodiments, the crystalline or semicrystalline polymer is a polyolefin, preferably polypropylene (PP), more preferably isotactic PP. The PP is preferably used in an amount of 10 to 60 wt.-%, preferably 15 to 50 wt.-%, more preferably 20 to 45 wt.-% and most preferably 30 to 40 wt.-%. In such embodiments, a filler, such as a fibrous filler, more preferably a glass fibre filler may be used, preferably in amounts of 5 to 20 wt.-%, more preferably 10 to 15 wt.-%. The amorphous polyamide is thus used preferably in amounts of 45 to 60 wt. %. Such compositions provide for medium to high printing speeds in conventional 3D printers, good interlayer adhesion, and low sink properties while retaining good mechanical properties, such as good stiffness.

In various embodiments, where the crystalline or semicrystalline polymer is a polyamide different from the amorphous polyamide, said second polyamide is preferably used in an amount of less than 35 wt.-%, preferably less than 30 wt.-%, more preferably 5 to 25 wt.-% and most preferably 7 to 20 wt.-%. In such embodiments, a filler, such as a fibrous filler, more preferably a glass fibre filler may be used, preferably in amounts of 1 to 10 wt.-%, more preferably 2 to 8 wt.-%. The amorphous polyamide is thus used preferably in amounts of 72 to 91 wt. %. It is generally preferred that if a second polyamide is used as the semicrystalline or crystalline polymer, its amount does not exceed 25 wt.-%, preferably does not exceed 20 wt.-% of the composition.

If no semicrystalline or crystalline polymer is used, the amorphous polyamide is preferably used in combination with a filler, such as a fibrous filler, for example cellulose or wood fibres. Alternatively, inorganic fillers, such as silica or glass fibres may be used, with glass fibres being preferred as fillers. In such embodiments, the amorphous polyamide is used in amounts of 70 to 95 wt.-%, with the remainder, i.e. 5 to 30 wt.-% being the filler. The amount of filler is preferably 10 to 20, more preferably about 15 wt.-%, in particular when glass, cellulose or wood fibres are used. Such compositions still provide for medium printing speeds and good stiffness, low sink. However, in order to provide improved characteristics, it is preferred that at least one semicrystalline or crystalline polymer is used. In view of the use of the at least one semicrystalline polymer it has been surprisingly found that it helps improving stiffness and interlayer adhesion of the thermoplastic composition and it thickens the thermoplastic composition.

Additionally or alternatively, there may be used a filler with thermal management function. Such fillers may be conductive fillers. Examples for fillers with thermal management function are alumina, metal powder, carbon black, boron nitride, graphite or graphene. Also suitable are fillers with electrical conductive properties, which can be used depending on the desired application.

The thermoplastic composition may comprise an additive with rheology modification functionality. Such additives may also be understood as thixotropic agents. They may also be useful in preventing sinking. Such additive may be chosen from cellulose derivatives, acrylic thickeners, gums and starch derivatives or modified polyether polyurethanes, modified acrylic thickeners and cellulose ethers. The addition of an additive with rheology modification functionality allows using thick beads in the printing process. It further allows for the printing of sharp edges and the printing of big parts without bead sinking problems or collapsing of the printed parts. Alternatively or additionally to said aforementioned rheology modifiers, fillers may be used that additionally have rheology modifying properties, such as, without limitation, silica and alumina and glass fibres, wood fibres and cellulosic fibres.

The thermoplastic composition according to the present invention optionally comprises 0.1 to 20 wt.-% of a compound selected from fillers with thermal management function or electrically conductive properties, or an additive with rheology modification functionality or a combination thereof, based on the total weight of the thermoplastic composition. In more preferred embodiments 1 to 20 wt.-%, most preferably 1 to 10 wt.-% of fillers with thermal management function are contained in the composition.

In various embodiments, the fillers used may have multiple of the above-mentioned properties, e.g. may be reinforcing, thermally conductive, electrically conductive and/or rheology modifying. For example, glass fibres were found to represent the most preferably filler material, as they have a stiffening effect as well as reduce sinking, thus creating a kind of "texture". The glass fibres may be surface-treated, and generally interact well with the polyamide, with an optional compatibilizer and can be distributed well in the final polymer blend. Other fillers that combine a reinforcing effect with a rheology modifying effect are other fibrous fillers, such as wood fibres and cellulosic fibres. All of the afore-mentioned fillers can be used in the above-disclosed amounts.

The thermoplastic composition according to the present invention optionally comprises coloring components, such as pigments. The pigments may be of a fluorescent or a phosphorescent type. Such pigments may also be understood as a dye. They may be organic or inorganic in chemical structure and may be added as such or alternatively as a masterbatch. In more preferred embodiments up to 10 wt.-%, most preferably up to 5 wt.-% of coloring components are included in the compositions.

The thermoplastic composition according to the present invention optionally comprises additives with a flame retardancy functionality. Such additives may be chosen from mineral flame retardants. Alternatively, they may be chosen from organohalogen or organophosphorous additives. Examples for minerals as flame retardants are aluminium hydroxide (ATH), magnesium hydroxide (MDH), huntite and hydromagnesite, various hydrates, red phosphorus, and boron compounds, mostly borates. Examples for organohalogen flame retardants are organochlorines such as chlorendic acid derivatives and chlorinated paraffins; organobromines such as decabromodiphenyl ether (decaBDE), decabromodiphenyl ethane (a replacement for decaBDE), polymeric brominated compounds such as brominated polystyrenes, brominated carbonate oligomers (BCOs), brominated epoxy oligomers (BEOs), tetrabromophthalic anyhydride, tetrabromobisphenol A (TBBPA) and hexabromocyclododecane (HBCD). The halogenated flame retardants may be used in conjunction with a synergist to enhance their efficiency. Additional examples are antimony trioxide, antimony pentoxide and sodium antimonate. Examples for organophosphorus flame retardants are organophosphates such as triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminium diethyl phosphinate. Further examples from the sulfonate family of flame retardants are: potassium diphenylsulfonesulfonate, sodium trichlorobenzene sulfonate and sodium toluenesulfonate.

Optionally, the organic flame retardant additive may comprise both a phosphorus and a halogen. Such compounds include tris(2,3-dibromopropyl) phosphate (brominated tris) and chlorinated organophosphates such as tris(1,3-dichloro-2-propyl)phosphate (chlorinated tris or TDCPP) and tetrakis (2-chlorethyl)dichloroisopentyldiphosphate.

Preferred flame retardants are phosphinate flame retardants. The flame retardants, if present, are typically used in amounts of 1 to 15, preferably 5 to 10 wt.-%, based on the total weight of the composition.

Other additives which may be used in conjunction with the present invention are antioxidants and stabilizers, UV stabilizers, lubricants, coupling agents, antistats, antimicrobials, impact modifiers and optical brighteners.

Preferred embodiments of the thermoplastic composition according to the invention have a melt flow rate measured at 175° C. and for 2.16 kg of between about 0.1 and about 20 g/10 min, preferably between about 0.5 and about 15 g/10 min.

Preferred embodiments of the thermoplastic composition according to the invention have an elastic modulus of between about 100 and about 2000 MPa, preferably between about 100 and about 1500 MPa, most preferably between about 100 and about 800 MPa.

Preferred embodiments of the thermoplastic composition according to the invention have a ring and ball softening point of 110 to 250° C., preferably 140 to 210° C.

The amorphous polyamide helps improving stiffness and interlayer adhesion and it thickens the thermoplastic composition, thereby solving the problem of brittleness in the printed three-dimensional object as well as dripping or sinking of the thermoplastic composition while manufacturing the object.

In order to print a three-dimensional object using the composition as defined above, the thermoplastic composition may be compounded. Compounding may be achieved in a reactor or preferably by extrusion. More preferably, the compounding is achieved by extrusion using a twin screw with a multifeeder system.

The extruded thermoplastic composition in granular form may be used directly in a 3D printer. Alternatively, the extruded thermoplastic composition may be extruded as or converted into a filament of the appropriate diameter and processed by a common FDM equipment operating with filament.

The thermoplastic composition may be heated within an extruder such as in a 3D printer (FIG. 1). FIG. 1 shows an exemplary extruder 10 having a feed material inlet 12, a first zone 14, a second zone 16, a third zone 18 and a fourth zone 20. The extruder comprises a pressure sensor 24 to measure pressure therein and a nozzle 28 connected to the fourth zone 20 by a hose 26. Each of the zones are fluidly connected to the hose and nozzle. Typically, material is fed into inlet 12 and travels through the zones 14, 16, 18 and 20 through the hose 26 to the nozzle 28. There are four different temperature zones within the extruder. The temperature increases from the inlet 12 to the nozzle 28. The temperature in the first zone 14 may be between about 150° C. and about 200° C., more preferably between about 160° C. and about 190° C., or about 180° C. In three subsequent temperature zones the temperature gradually increases to reach an outlet temperature at the fourth zone 20 of between about 190° C. and about 240° C., more preferably between about 200° C. and about 220° C., or about 210° C. The temperature in between (second zone 16 and third zone 18) may have a temperature between the inlet and the outlet temperature, i.e. between about 190° C. and about 220° C., or between about 200° C. and about 210° C. The temperature in the tube 26 may be between about 170° C. and about 210° C., more preferably between about 180° C. and about 200° C., or about 190° C. The temperature in the nozzle 28, for the deposition of the heated thermoplastic composition, may be increased to between about 200° C. and about 250° C., or about 240° C. The pressure for the flow of the thermoplastic composition may be between about 10 bar and 30 bar, or between about 15 bar and 25 bar, or about 22 bar.

The printing of an object 30 with the thermoplastic composition may be accomplished by using fused modelling deposition (FDM). Hence, the layer on layer deposition in the printing process may be accomplished with the layers being molten. Alternatively, the thermoplastic composition may be converted into powder form and used in a Sintered Laser System (SLS), which is based on powder layer deposition that is molten selectively by heat, for example a laser.

In further preferred embodiments the thermoplastic composition is used for making printed three-dimensional objects. The printed three-dimensional object may be a house-hold article a furniture object or building module, optionally selected from the group consisting of chairs, stairs, tables, beds, gardening appliances or office appliances optionally selected from the group consisting of shelfs, desks, dividers and partitions but is not limited thereto.

All embodiments disclosed herein in relation to the thermoplastic compositions apply similarly to the methods and uses of the invention and vice versa.

The invention is further illustrated by the following, non-limiting examples.

EXAMPLES

Measurement Methods
Melt Flow Rate

Measured with a Ceast instrument Melt Flow Tester 130 according to ASTM D 1238/ISO 1133 modified. The data were obtained at 175° C.-230° C. with 2.16 or 10.0 kg and holding time of 600 seconds, as indicated below, to get a homogeneous comparison.
Elongation Modulus Elongation was determined at Break Elastic Modulus. Yield Strength were measured according "ASTM D638 Mechanical Tensile Properties" Dumbell specimens type IV.
Ring and Ball Softening Point The ring and ball softening point of the thermoplastic composition was measured in accordance with ASTM E 28.

Method for Preparation of the Polyamide

Example 1

General Preparation Method

In a stainless steel reactor with mechanical stirrer and under inert atmosphere (nitrogen gas) all acid components (components a) to c)), an optional acid catalyst and antioxidants were added at room temperature (about 25° C.) and heated to 120° C. Then the linear diamine (compound d)) was added drop wise. The system was heated to 220° C. for about 1 hour and the water was distilled off under vacuum (30 mbar). Subsequently, nitrogen gas was supplied into the flask to restore atmospheric pressure; a sample was taken to control the degree of conversion by acid and amine end groups titration. At a conversion >/=99% the reaction is considered complete and the product is discharged by mean of gear pump that push the melt through an underwater pelletizer obtaining a granulated amorphous polyamide
General Method for the Generation of Amorphous Polyamides In a stainless steel reactor with mechanical stirrer and under inert atmosphere (nitrogen gas) all acid components are loaded. In various embodiments, these may include:

| a) Dimerized fatty acids | % w/w |
| b) Dicarboxylic acids | % w/w |

According to the know art an optional acid catalyst and antioxidants are added at room temperature (about 25° C.) and heated to 120° C. A mono functional acid or amine can be used as chain stopper to adjust MW.

Then one or more diamines

| c) linear diamine | % w/w |
| d) alicyclic diamine | % w/w |
| e) polyetheramine | % w/w |
| f) other diamines | % w/w | can be added drop wise. The system is heated to 220° C. for about 1 hour and the water was distilled off under vacuum (30 mbar).

Subsequently, nitrogen gas was supplied into the flask to restore atmospheric pressure; a sample was taken to control the degree of conversion by acid and amine end groups titration. At a conversion >/=99% the reaction is considered complete and the product is discharged by mean of gear pump that push the melt through an underwater pelletizer obtaining a granulated amorphous polyamide.
Production of Amorphous Polyamide #1

A polyamide was prepared by reacting the following materials (the amount stated for each component is in parts by weight) in accordance with the method described in the above general example:

| Component | |
| --- | --- |
| a) Distilled dimer fatty acid (CAS No. 61788-89-4) | 82.5% w/w |
| b) none | |
| c) Hexamethylene diamine | 16.5% w/w |
| d) None | |
| e) None | |
| f) None | |
| Thermal Antioxidant | 1.0% w/w |
| Acid catalyst (phosphoric acid) | one drop |

The mixture is heated and water is distilled off.
The resulting polyamide has:
Melt flow rate of 10 gr/10 minutes at 175° C. 2.16 kg
The softening point is about 150° C.
Production of Amorphous Polyamide #2

A polyamide was prepared by reacting the following materials (the amount stated for each component is in parts by weight) in accordance with the method described in the above general example:

| Component | |
|---|---|
| a) Distilled dimer fatty acid (CAS No. 61788-89-4) | 78.5% w/w |
| b) Sebacic Acid | 3.0% w/w |
| c) Hexamethylene diamine | 17.5% w/w |
| d) None | |
| e) None | |
| f) None | |
| Thermal Antioxidant | 1% w/w |
| Acid catalyst (phosphoric acid) | one drop |

The mixture is heated and water is distilled off.
The resulting polyamide has:
Melt flow rate of 7 gr/10 minutes at 175° C. 2.16 kg
The softening point is 165° C.

Compound Preparation

The compounding process is carried out in a co-rotating twin-screw extruder equipped with a multicomponent gravimetric feeder and side feeder. The polyamide can be dry blended with other polymers, antioxidant or other powder additives. Fillers can be dosed through a side feeder. Inside the extruder in the kneading-zone the temperatures were from 220° C. to 260° C. The temperatures at the die-head/nozzle were driven at 200° C. to 208° C. Torque of the extruder was between 35-50% without filler up to 75% with high content of glass fibers. The rest of the recipes were driven with 33% to 35% torque.

Compound #1 (Comparative)
Pure amorphous Polyamide #1.

Compound #2

Amorphous Polyamide #1 89% and 10% ethylene copolymer and 1% of antioxidant were dosed gravimetrically through the main hopper with a T profile along the co-rotating twin screw 130-200° C.
Material was extruded in strands, cooled in a water bath at T<15° C. and cut with rotating blades into pellets.

Compound #3

Amorphous Polyamide #1 79% was dry blended with 1% of Antioxidant and fed through the main hopper with a T profile along the co-rotating twin screw 130-230° C. From the side feeder positioned at ¼ of the screw length, 20% glass fibers were dosed. Material was extruded in strands, cooled in a water bath at T<15° C. and cut with rotating blades into pellets.

Compound #4

Amorphous Polyamide #1 94% was dry-blended with 5% of silica, 1% of antioxidant and fed through the main hopper with a T profile along the co-rotating twin screw 130-220° C. Material was extruded in strands, cooled in a water bath at T<15° C. and cut with rotating blades into pellets.

Compound #5

Amorphous Polyamide #1 75% was dry-blended with 1% of antioxidant and fed through the main hopper with a T profile along the co-rotating twin screw 130-200° C. 15% cellulosic fibers were added through a side feeder positioned at ¼ of the main screw length in a low shear mixing zone to avoid overheating and "burning" of fibers. Material was extruded in strands, cooled in a water bath at T<15° C. and cut with rotating blades into pellets.

Compound #6

Amorphous Polyamide #1 75% was dry-blended with 1% of antioxidant and fed through the main hopper with a T profile along the co-rotating twin screw 130-200° C. 15% wood fibers were added through a side feeder positioned at ¼ of the main screw length in a low shear mixing zone to avoid overheating and "burning" of fibers. Material was extruded in strands, cooled in a water bath at T<15° C. and cut with rotating blades into pellets.

Compound #7

Amorphous Polyamide #1 89.5% and 9.5% PA6 containing glass fibers (GF) (CELSTRAN® PA6-GF30-01) dry blended with 1% of Antioxidant were dosed gravimetrically through the main hopper with a T profile along the co-rotating twin screw 140-240° C.
Material was extruded in strands, cooled in a water bath at T<15° C. and cut with rotating blades into pellets.

Compound #8

Same as compound #7, with following composition: Amorphous Polyamide #1 6910 74.5% and 24.5% PA6 containing GF and 1% of antioxidant.

Compound #9

Amorphous Polyamide #1 89.5% and 9.5% of Polypropylene (CELSTRAN® PP-GF25-0403) dry blended with 1% of Antioxidant were dosed gravimetrically through the main hopper with a T profile along the co-rotating twin screw 140-240° C.
Material was extruded in strands, cooled in a water bath at T<15° C. and cut with rotating blades into pellets Compound #10

Same as compound #9, with following composition: Amorphous Polyamide #1 74.5% and 24.5% Polypropylene (CELSTRAN® PP-GF25-0403) dry blended with 1% of Antioxidant.

Compound #11

Same as compound #9, with following composition: Amorphous Polyamide #1 49.5% and 49.5% of Polypropylene (CELSTRAN® PP-GF25-0403) dry blended with 1 of Antioxidant Compound #12

Amorphous Polyamide #1 54% and 28% of EVA (Elvax 4260), 5% of maleated compatibilizer dry blended with 1% of Antioxidant were dosed gravimetrically through the main hopper with a T profile along the co-rotating twin screw 140-240° C.
From the side feeder positioned at ¼ of the screw length, 12% glass fibers were dosed.
Material was extruded in strands, cooled in a water bath at T<15° C. and cut with rotating blades into pellets.

The MFR for Compound #12 is shown in the following table:

TABLE 1

| | MFR of Compound # 12 Compound | | |
|---|---|---|---|
| | Load 10 kg | | |
| | Std method | | Holding |
| T [° C.] | 0.21% $H_2O$ MFR [g/10 min] | 0.11% $H_2O$ MFR [g/10 min] | 0.10% $H_2O$ MFR [g/10 min] |
| 200 | 8.9 | 7.4 | 15.4 |
| 210 | 10.2 | 9.0 | 16.2 |
| 220 | 12.5 | 9.9 | 17.2 |
| 230 | 14.6 | 13.0 | 19.4 |

The following compositions were utilized (Table 2):

TABLE 2

Components of the thermoplastic compositions (in wt.-%)

| | Composition | | |
|---|---|---|---|
| Comp# | amorphous polyamide | crystalline or semi-crystalline polymer | filler |
| 1 | 100 | 0 | 0 |
| 2 | 90 | 10 (amorphous ethylene copolymer) | 0 |
| 3 | 80 | 0 | 20 (Glass fibre) |
| 4 | 95 | 0 | 5 (Silica) |
| 5 | 85 | 0 | 15 (Cellulosic fibre) |
| 6 | 85 | 0 | 15 (Wood fibers) |
| 7 | 90 | 7 (PA6) | 3 (Glass fiber) |
| 8 | 75 | 18.5 (PA6) | 7.5 (Glass fiber) |
| 9 | 90 | 7.5 (PP) | 2.5 (Glass fiber) |
| 10 | 75 | 19 (PP) | 6 (Glass fiber) |
| 11 | 50 | 37.5 (PP) | 12.5 (Glass fiber) |
| 12 | 54 | 34 (EVA) | 12 (Glass fiber) |

As "amorphous polyamide" amorphous polyamide #1 was used. "PA6" refers to a crystalline or semi-crystalline polyamide, different from the amorphous polyamide (CELSTRAN PA6-GF30-01). "PP" is an isotactic polypropylene (CELSTRAN® PP-GF25-0403 P10/10). "EVA" is ethyl vinyl acetate a grade with 28% VA and MFR 5-15 g/10 minutes at 190° C. 2.16 kg. The amorphous ethylene copolymer is functionalized with maleic anhydride and is Exxelor™ VA 1803. Filler component are glass fibers (i.e. Thermoflow® 701) or cellulosic fibers (Alba-Fibre® C-500PH) or wood particles or silica. Table 3 refers to some physical properties of the exemplified compositions of Table 2 and their printing properties:

| Comp # | Print speed | effect | Yield (MPa) | Break (MPa) | El. at Break (%) | Elastic Mod at 2% (MPa) | Shore D |
|---|---|---|---|---|---|---|---|
| 1 | low | benchmark | 11.8 | 29.9 | 539.0 | 129.0 | 38.0 |
| 2 | low | prevent sinking | 9.9 | 22.7 | 537.0 | 137.9 | 40.0 |
| 3 | low | stiffness | 19.0 | 11.0 | 123.0 | 447.0 | 61.0 |
| 4 | low | prevent sinking | 11.0 | 30.0 | 559.0 | 127.0 | 49.0 |
| 5 | medium | Low sink, stiffness | 15.5 | 10.2 | 30.7 | 275.3 | 58.0 |
| 6 | medium | low sink, stiffness | 15.0 | 10.0 | 22.0 | 291.0 | 58.0 |
| 7 | medium | low sink, stiffness, adhesion | 12.9 | 23.1 | 524.7 | 187.2 | 50.0 |
| 8 | medium | low sink, stiffness, adhesion | 14.3 | 10.8 | 164.0 | 249.7 | 56.0 |
| 9 | low | low sink, stiffness, adhesion | 13.6 | 17.9 | 457.2 | 210.6 | 52.0 |
| 10 | medium | low sink, stiffness, adhesion | 15.1 | 12.8 | 437.6 | 253.3 | 54.0 |
| 11 | high | low sink, stiffness, adhesion | 19.6 | 15.5 | 226.6 | 409.2 | 62.0 |
| 12 | high | low sink, interlayer adhesion | 10.5 | 9.9 | 394 | 137 | 50 |

Table 4 shows some additional physical properties:

| Composition # | MFR (175° C.-2, 16 kg) g/10' | Ring & ball softening point ° C. | DSC cryst. peak ° C. | ΔH J/g | DSC cryst. peak ° C. | ΔH J/g |
|---|---|---|---|---|---|---|
| 1 | 12.0 | 144.7 | | | 44.0 | 12.0 |
| 2 | 10.5 | 150.6 | | | 43.0 | 15.6 |
| 3 | 6.6 | 165.1 | | | 43.0 | 11.9 |
| 4 | 10.7 | 157.6 | | | 43.0 | 19.9 |
| 5 | 3.5 | n a | | | 42.6 | 11.8 |
| 6 | 4.3 | 160.0 | | | 42.0 | 12.0 |
| 7 | 8.5 | 165.6 | 183.0 | 3.0 | 44.4 | 12.0 |
| 8 | 3.7 | | 181.7 | 7.5 | 44.3 | 10.7 |
| 9 | 8.8 | 158.8 | 96.0 | 3.3 | 44.6 | 11.3 |
| 10 | 5.4 | 172.9 | 101.5 | 12.3 | 44.0 | 7.9 |
| 11 | 2.3 | 206.1 | 104.4 | 25.1 | 40.6 | 7.7 |
| 12 | 0.3 | n.d. | | | 40.7 | 23.45 |

MFR refers to the melt flow rate.

DSC refers to differential scanning calorimetry measurements, with the two values corresponding to two peaks in the cooling run. This occurs depending on the type of polymer blended with PA and its amount. A peak at high T is detectable when the compound still show phases of the higher melting polymer. Its intensity depends upon the quantity of the polymer. If not stated otherwise, DSC measurements have been carried out in accordance with DIN EN ISO 11357-3:2013-04.

A typical process for the preparation of a three-dimensional object using the thermoplastic composition is further outlined below:

A polyamide hot melt (polyamide #1) is blended with isotactic commercial polypropylene and compatibilized with a commercial maleated (or glycidyl functionalized) Terpolymer Ethylene—Acrylic Ester—and filled with glass fibers. A typical ratio is the following: Polyamide (40 wt.-%), Polypropylene (40 wt.-%), Compatibilizer (5 wt.-%), glass fiber (15 wt.-%). The composition is compounded by a twin screw extruder at 220° C.

The extruded filament is cooled into a water bath at 8° C. and granulated by cutting with a multiblade pelletizer. Granules are dried below 0.2% of residual moisture. The resulting product is printable by a XL 3D Printers Kamermaker.

Figure 2:
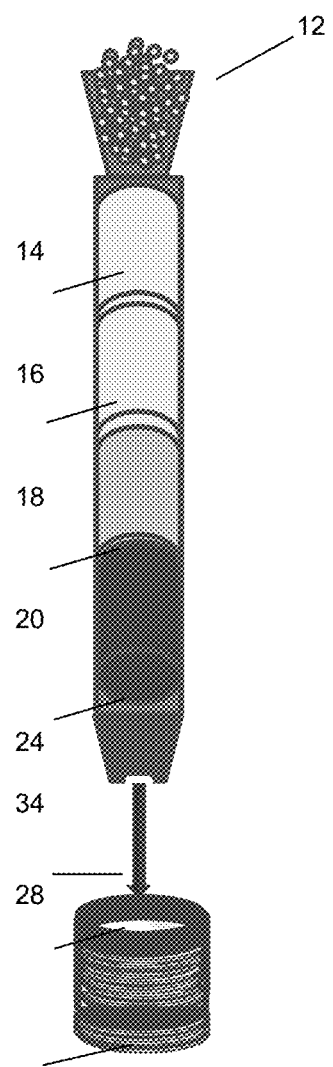
FIG. 2 is another embodiment of an exemplary extruder such as a 3D printer.

Table 5 below shows the typical temperatures and pressure within exemplarily extruders such as in 3D printers depicted in FIGS. 1 and 2. Whereby the extruder can be horizontally (FIG. 1) or vertically (FIG. 2) applied. The extruders have 4 extruder zones (14-20) each having different temperatures T1 (14), T2 (16), T3 (18) and T4 (20), both contain a pressure sensor 24 and a nozzle 28 having a specific temperature. Furthermore, the extruder in FIG. 1 has a specific temperature at the hose 26. In the extruder of FIG. 2 the head 34 has a specific temperature.

TABLE 5

| speed % | pressure (bar) | T tube (° C.) | T nozzle (° C.) | T1 (° C.) | T2 (° C.) | T3 (° C.) | T4 (° C.) |
|---|---|---|---|---|---|---|---|
| 100 | 22 | 190 | 240 | 180 | 200 | 210 | 210 |

The invention claimed is:

1. A thermoplastic 3D printing composition consisting of:
   (a) at least 25 wt. % of an amorphous polyamide polymer, the polyamide polymer being a reaction product of:

a1) at least one dimerized fatty acid;
a2) optionally at least one mono carboxylic acid;
a3) optionally at least one linear dicarboxylic acid; and
a4) at least one linear diamine;
(b) at least 5 wt. % of a crystalline or semicrystalline thermoplastic polymer selected from the group consisting of polypropylene (PP), ethylvinylacetate (EVA), polyacrylate, polyamide different from (a) and combinations thereof;
(c) optionally at least 0.1 wt. % of a compatibilizing agent; and
(d) optionally at least 1 wt. % of a filler.

2. The thermoplastic composition according to claim 1, wherein the composition comprises at least 40 wt. % of the amorphous polyamide polymer.

3. The thermoplastic composition according to claim 1, wherein the crystalline or semicrystalline thermoplastic polymer is selected from polypropylene (PP).

4. A thermoplastic 3D printing composition comprising:
(a) at least 25 wt. % of an amorphous polyamide polymer, the polyamide polymer being a reaction product of:
a1) at least one dimerized fatty acid;
a2) optionally at least one mono carboxylic acid;
a3) optionally at least one linear dicarboxylic acid; and
a4) at least one linear diamine;
(b) at least 5 wt. % of crystalline or semicrystalline isotactic polypropylene (PP);
(c) optionally at least 0.1 wt. % of a compatibilizing agent; and
(d) optionally at least 1 wt. % of a filler.

5. The thermoplastic composition according to claim 1, wherein the at least one mono carboxylic acid a2) is present and is selected from the group consisting of linear and branched $C_3$ to $C_{24}$ mono carboxylic acids or combinations thereof.

6. The thermoplastic composition according to claim 1, wherein the at least one linear dicarboxylic acid a3) is present and is selected from the group consisting of linear $C_6$ to $C_{18}$ dicarboxylic acids and combinations thereof.

7. The thermoplastic composition according to claim 1, wherein the at least one linear diamine a4) comprises a linear aliphatic diamine having 1 to 10 carbon atoms.

8. The thermoplastic composition according to claim 1, wherein the at least one linear diamine a4) comprises 1,2-ethylene diamine.

9. The thermoplastic composition according to claim 1, comprising at least 5 wt. % of the filler.

10. The thermoplastic composition according to claim 1, wherein the filler is present and selected from a reinforcing filler, a fibrous filler or both a reinforcing filler and a fibrous filler.

11. The thermoplastic composition according to claim 1, wherein the filler is selected from the group consisting of glass fibers, glass microspheres, silica, calcium carbonate, talc and combinations thereof.

12. The thermoplastic composition according to claim 1, wherein the compatibilizing agent is present and is selected from the group consisting of maleated aliphatic polymers, waxes, functionalized acrylates and ethylene/propylene copolymers.

13. The thermoplastic composition according to claim 1, wherein the composition further comprises at least one additive selected from additives with rheology modification functionality, fillers with thermal management function, coloring components, additives with flame retardancy properties, additives to change aesthetic aspects, and combinations thereof.

14. The thermoplastic composition according to claim 1, wherein the composition further comprises at least one additive and each said additive is present in an amount of 0.1 to 20 wt. %, based on the total weight of the composition.

15. The thermoplastic composition according to claim 1, wherein the crystalline or semicrystalline thermoplastic polymer is selected from polypropylene (PP), ethylvinylacetate (EVA), polyacrylate, and combinations thereof.

* * * * *